United States Patent
Ramakrishnan

(10) Patent No.: US 8,595,780 B2
(45) Date of Patent: *Nov. 26, 2013

(54) SYSTEMS AND METHODS FOR PROCESSING MEDIA CONTENT REQUESTS

(71) Applicant: AT&T Intellectual Property I, L.P., Atlanta, GA (US)

(72) Inventor: Kadangode Ramakrishnan, Berkeley Hgts, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/755,306

(22) Filed: Jan. 31, 2013

(65) Prior Publication Data

US 2013/0139208 A1  May 30, 2013

Related U.S. Application Data

(63) Continuation of application No. 12/856,793, filed on Aug. 16, 2010, now Pat. No. 8,392,956.

(51) Int. Cl.
| | |
|---|---|
| *G06F 3/00* | (2006.01) |
| *G06F 13/00* | (2006.01) |
| *H04N 5/445* | (2011.01) |
| *H04N 7/173* | (2011.01) |
| *H04N 5/76* | (2006.01) |

(52) U.S. Cl.
USPC .............. 725/97; 725/37; 725/86; 725/87; 725/91; 725/95; 725/105; 386/291; 386/298

(58) Field of Classification Search
None
See application file for complete search history.

(56) References Cited

U.S. PATENT DOCUMENTS

| | | |
|---|---|---|
| 7,472,197 B2 | 12/2008 | Li et al. |
| 2005/0028206 A1 | 2/2005 | Cameron et al. |
| 2006/0294555 A1 | 12/2006 | Xie |
| 2008/0022320 A1 | 1/2008 | Ver Steeg |
| 2012/0042350 A1 | 2/2012 | Ramakrishnan |

OTHER PUBLICATIONS

Non-Final Office Action for U.S. Appl. No. 12/856,796 mailed Jul. 26, 2012, 51 pages.
Notice of Allowance for U.S. Appl. No. 12/856,796 mailed Oct. 31, 2012, 44 pages.

*Primary Examiner* — Justin Shepard
(74) *Attorney, Agent, or Firm* — Toler Law Group, PC

(57) ABSTRACT

A method includes sending a unicast transmission including at least a portion of media content to a media device in response to determining, at a media distribution computing device, that a request for a media stream to be provided to the media device does not indicate a scheduled recording of the media content associated with the media stream and joining the media device to a multicast group associated with the media stream without sending the unicast transmission to the media device in response to determining, at the media distribution computing device, that the request indicates the scheduled recording of the media content.

20 Claims, 5 Drawing Sheets

SYSTEMS AND METHODS FOR PROCESSING MEDIA CONTENT REQUESTS

CLAIM OF PRIORITY

The present application is a continuation of and claims priority from U.S. patent application Ser. No. 12/856,793, filed on Aug. 16, 2010, and, entitled "SYSTEMS AND METHODS FOR PROCESSING MEDIA CONTENT REQUESTS", the contents of which are expressly incorporated herein by reference in their entirety.

FIELD OF THE DISCLOSURE

The present disclosure is generally related to systems and methods for processing media content requests for channel changes and for recording the media content.

BACKGROUND

Television viewing is part of daily life for many people. Certain networks that provide video content may have limitations that lead to an undesirable television viewing experience. For example, viewers may experience channel change latency after switching channels, as video content of a new channel is sent to and buffered by a receiving device. Channel change servers may be installed in a network to reduce the channel change latency by providing an initial unicast stream of a requested channel to a receiving device requesting a channel change to populate the buffer so that the requested channel can be quickly displayed. After a multicast join to the channel for the receiving device is implemented, the unicast stream may be stopped. Channel change servers may receive significant loads when many change channel requests are received (e.g., at approximately fifteen minute intervals when commercials are shown, when programs end, or both). Also, the unicast streams may impose considerable load on the network during the times when the many change channel requests are implemented.

DETAILED DESCRIPTION

Figure 1:
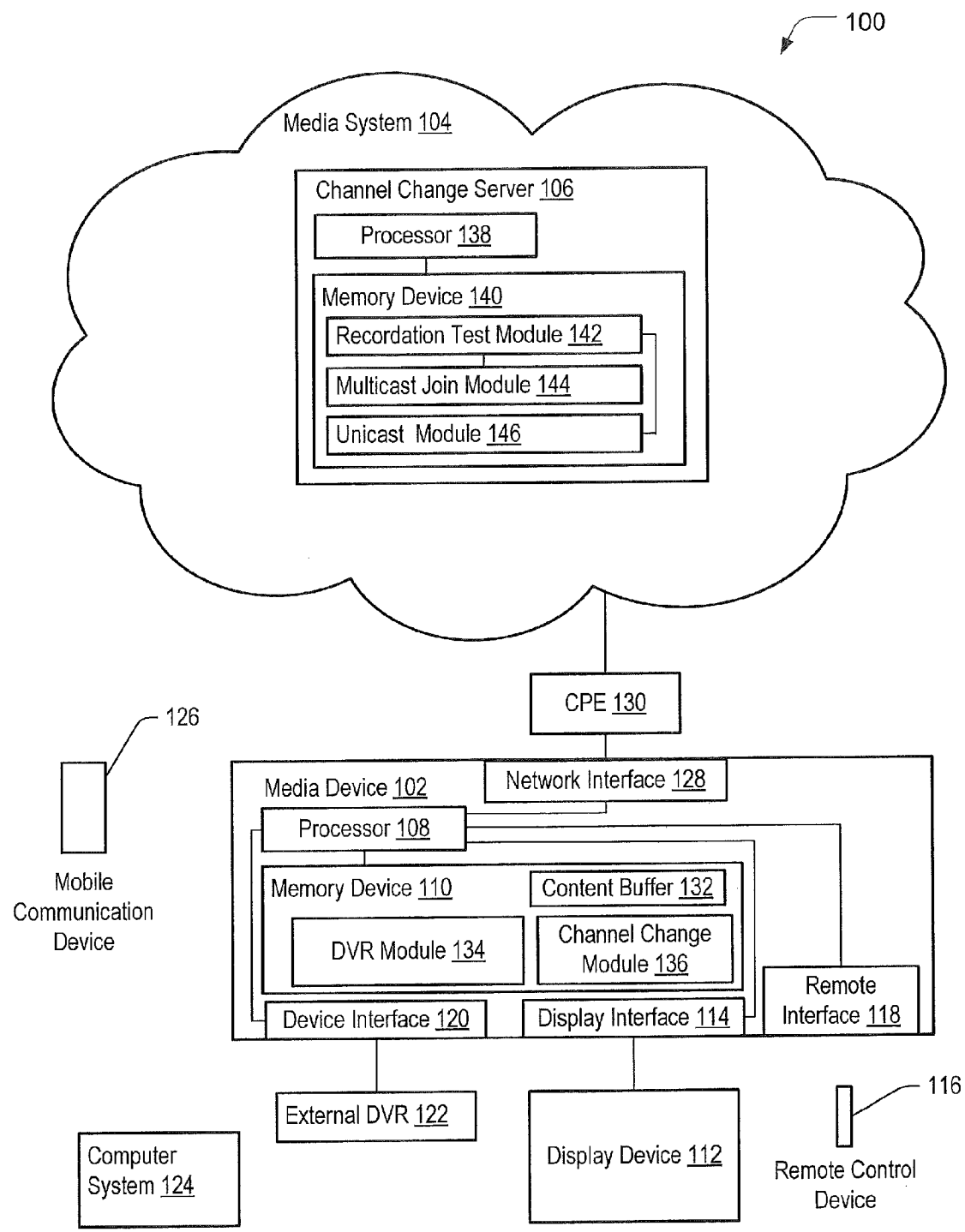
FIG. 1 is a block diagram of an embodiment of a system for processing media content requests.

Channel change servers of a media system (e.g., of an Internet protocol television system) may receive channel change requests from subscribers. The channel change servers may facilitate multicast joins to appropriate content in response to received channel requests. In addition to facilitating multicast joins to the appropriate content, the channel change servers may send unicast transmissions of requested content to requestors when the channel change requests indicate that requested media content is not for time-delayed viewing. When the channel change requests indicate that the requested media content is for time-delayed viewing, the channel change servers do not send the unicast transmission of the requested content to the requestor.

In a particular embodiment, a method includes receiving, at a multimedia distribution computing device, a request for a media stream to be provided to a media device. The method includes determining, at the multimedia distribution computing device, whether media content of the media stream is for time-shifted viewing. The method includes joining the media device to a multicast group associated with the media stream without sending the unicast transmission to the media device when the media content is determined to be for time-shifted viewing. The method includes sending a unicast transmission including at least a portion of the media content to the media device when the media content is determined not to be for time-shifted viewing.

In a particular embodiment, a system includes at least one processor and a memory device accessible to the at least one processor. The memory device includes instructions executable by the at least one processor to receive a user command to record media content of a first media stream at a particular time. The memory device includes instructions executable by the at least one processor to send a first request to the media system to receive the first media stream. The first request includes a time-shift indicator indicating that no unicast transmission of the first media stream should be sent. The request is sent at least a predetermined interval before the particular time to accommodate time needed for the media system to join the system to a multicast group that provides the first media stream. The memory device includes instructions executable by the at least one processor to receive the media content via the first media stream as a multicast transmission. The memory device also includes instructions executable by the at least one processor to store the media content.

In a particular embodiment, a non-transitory computer readable medium includes instructions executable by a processor to determine whether media content of a particular media stream is for time-shifted viewing at a media device based on a request from the media device. The non-transitory computer readable medium includes instructions executable by the processor to join the media device to a multicast group associated with the particular media stream without sending the unicast transmission to the media device in response to determining that the media content is for time-shifted viewing. The non-transitory computer readable medium includes instructions executable by the processor to send a unicast transmission of at least a portion of the media content to the media device in response to determining that the media content is not for time-shifted viewing.

FIG. 1 is a block diagram illustrating an embodiment of a system 100 for processing media content requests. The system 100 includes a media device 102 that communicates with one or more network devices of a media system 104. The one or more network devices of the media system 104 may include a channel change server 106, a Digital Subscriber Line Access Multiplexer (DSLAM), an intermediate office switch or router, a central office switch or router, other servers, other routers, or any combination thereof. The media device 102 may be a set-top box device, a computer system, a laptop computer, or another device that receives data from the media system 104. The media device 102 also transmits data to the media system 104. The media device 102 may be one of a plurality of media devices that are authorized to access the media system 104. The media system 104 may be an Internet protocol television (IPTV) system, an on-demand system, another type of media content distribution system, or a combination thereof.

The media device 102 may include at least one processor 108 and at least one memory device 110 accessible to the at least one processor 108. The at least one processor 108 may communicate media content received from the media system 104 to a display device 112 via a display interface 114. The at least one processor 108 may communicate with a remote control device 116 via a remote interface 118. The at least one processor 108 may also communicate media content received from the media system 104 via a device interface 120 to one or more other devices coupled to the media device 102. The one or more other devices may include, but are not limited to, an external digital video recorder (DVR) 122, a computer system (e.g., a desktop computer system or a laptop computer system) 124, a mobile communication device 126, or another device that is capable of communicating over a wired or wireless connection with the media device 102 via the device interface 120, the display interface 114, the remote interface 118, or a network interface 128. Some of the other devices may be able to communicate with the media system 104 without the communication passing through the media device 102. For example, the computer system 124 may be able to communicate with the media system 104 via a public access network (e.g., the Internet). The mobile communication device 126 may be able to communicate with the media system 104 via the public access network or via a mobile communications network. The other devices may receive media content without first receiving a unicast transmission of the media content when the other devices receive the media content for storage and later playing rather than for immediate viewing by streaming.

The media device 102 may communicate with one or more network devices of the media system 104 via the network interface 128. Customer premises equipment (CPE) 130 may facilitate communication between the network interface 128 and the one or more network devices of the media system 104. The CPE 130 may include a router, a local area network device, a modem (e.g., a digital subscriber line (DSL) modem or a cable modem), a residential gateway, any other suitable device for facilitating communication between the network interface 128 of the media device 102 and network devices of the media system 104, or any combination thereof.

The at least one memory device 110 may include at least one content buffer 132. The at least one content buffer 132 may receive media content before the media content is sent to the display device 112 or to another device (e.g., the computer system 124 or the external DVR 122). For example, the at least one content buffer 132 may buffer data packets of the media content to enable reordering of the data packets from a received order to a presentation order. To avoid buffer underflow, the at least one content buffer 132 is to be filled to a threshold level before the media content is sent to the display device 112 or another device.

When received media content is to be sent to the display device 112, the media device 102 may initially receive a unicast transmission of the media content to quickly populate the at least one content buffer 132 to the threshold level so that the media content can be quickly displayed on the display device 112. The media device 102 may also receive a multicast transmission of the media content. After a selected period of time, or when the media device 102 informs the media system 104 that the at least one content buffer 132 is populated to the threshold level, the unicast transmission is stopped, and the display device 112 shows the media content received via the multicast transmission.

The at least one memory device 110 may include one or more modules. The modules may include instructions executable by the at least one processor 108 to perform one or more tasks. The one or more modules may include, but are not limited to, a DVR module 134 and a channel change module 136. The DVR module 134 may allow media content received from the media system 104 to be stored in the at least one memory device 110. The DVR module 134 may allow for on-demand recording or scheduled recording. On-demand recording may allow a user to begin recording media content received for a particular channel that is currently being sent to the display device 112. The media content may be a live television broadcast. After initiation of the on-demand recording, the user may be able to change the channel so that different media content is sent to the display device 112 without changing the media content being recorded. Scheduled recording may allow a particular channel to be recorded beginning at a specified start time and ending at a specified end time. A user interface presented by the DVR module 134 may enable the user to specify a particular channel to be recorded, the start time, and the end time using the remote control device 116 or another input device. The DVR module 134 may be able to simultaneously record two or more separate channels.

The channel change module 136 may enable the user to change the media content received from the media system 104. The channel change module 136 also enables a channel of the media system 104 to be selected for recording by the DVR module 134 or the external DVR 122. The channel change module 136 may receive a command to obtain selected media content as a media stream from a particular channel of the media system 104 (e.g., the command may be received from the remote control 116, from the computer system 124, from the external DVR 122, from the DVR module 134, from the mobile communication device 126, or from another device). The command may cause the channel change module 136 to form a request for the selected media content. The request may include identification of the media device 102, an identifier of the particular channel that provides the selected media content, and a time-shift indicator. The time-shift indicator may be a first value (e.g., 1) when the media content is for time-delayed viewing (e.g., is to be recorded). When the time-shift indicator is the first value, the time-shift indicator indicates to the channel change server 106 of the media system 104 that no unicast transmission of the media stream that includes the selected media content should be sent to the media device 102. The time-shift indicator may be a second value (e.g., 0) when the media content is not for time-delayed viewing (e.g., the media content is to be sent to the display device 112). When the time-shift indicator is the second value, the time-shift indicator indicates to the channel change server 106 of the media system 104 that the unicast transmission of the media stream that includes the selected media content should be sent to the media device 102. The time-shift indicator may be a single bit in the request. The request may be sent from the media device 102 to the channel change server 106 of the media system 104.

The channel change server 106 may be one of a plurality of channel change servers of the media system 104. Each channel change server 106 may serve a particular area covered by the media system 104. The channel change server 106 may include one or more processors 138 that are able to access at least one memory device 140. The at least one memory device 140 may include a recordation test module 142, a multicast join module 144, and a unicast module 146.

When the channel change server 106 receives a request related to the media device 102 for a channel change to a particular channel, the one or more processors 138 access instructions in the recordation test module 142 to determine whether the request includes a time-shift indicator indicating that the media content is for time-shifted viewing. The request may be sent from the media device 102 or from another device (e.g., the computer system 124 or the mobile communication device 126). When the time-shift indicator indicates that the media content is not for time-shifted viewing, the recordation test module 142 forwards the request to the multicast join module 144 and to the unicast module 146. When the time-shift indicator indicates that the media content is for time-shifted viewing, the recordation test module 142 forwards the request to the multicast join module 144 without forwarding the request to the unicast module 146. Not forwarding the request to the unicast module 146 inhibits a unicast transmission of the media content from being sent to the media device 102. The unicast transmission is not needed since the media content is to be recorded. Not supplying the unicast transmission may reduce the work load of network devices and may provide for more efficient usage of unicast bandwidth of the media system 104.

The multicast join module includes instructions that facilitate completing a multicast join of the media device 102 to a multicast group. The multicast group provides a multicast transmission of the media content of the particular channel to the media device 102.

The unicast module 146 includes instructions that facilitate sending the unicast transmission of the particular channel to the media device 102. The unicast transmission of the particular channel may be sent to the media device 102 from the channel change server 106 or from another network device of the media system 104. The unicast transmission may be sent for a set period of time (e.g., for 16 seconds or less) or until the channel change server receives an instruction from the media device 102 to stop the unicast transmission.

Figure 2:
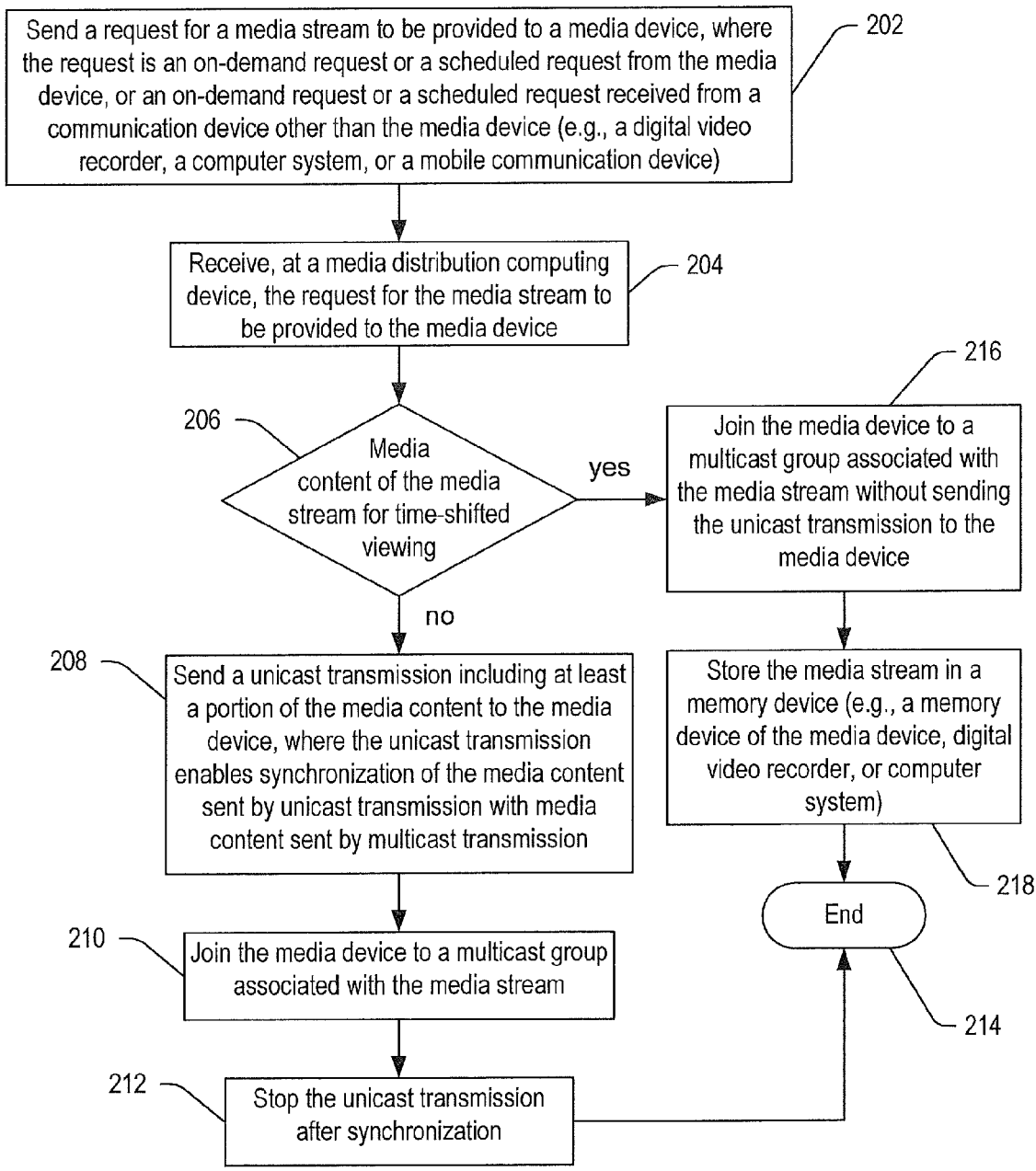
FIG. 2 is a flow diagram of a particular embodiment of a method for processing media content requests.

FIG. 2 is a flow diagram of a particular embodiment of a method for processing media content requests. At block 202, a request for a media stream to be provided to a media device is sent. The media device may be the media device 102 depicted in FIG. 1. The request may be an on-demand recording request or a scheduled recording request. The request may come from the media device or from another device (e.g., from the external DVR 122, the computer system 124, or from the mobile communication device 126 depicted in FIG. 1).

At 204, the request for the media stream to be provided to the media device is received at a media distribution computing device. The media distribution computing device may be the channel change server 106 depicted in FIG. 1 or another computing device of the media system 104. At 206, a determination may be made at the media distribution computing device whether media content of the media stream is for time-shifted viewing. The determination may be made based on a time-shift indicator included in the request. The time-shift indicator may be set to a first value (e.g., one) by the device that sent the request when the media content is for time-shifted viewing. The time-shift indicator may be set to a different value (e.g., zero) by the device that sent the request when the media content is not for time-shifted viewing (e.g., when the media content is to be sent from the media device to a display device). The time-shift indicator may be a single bit in the request.

When the determination, at 206, is that the media content is not for time-shifted viewing, the media distribution computing device sends a unicast transmission including at least a portion of the media content to the media device, at 208. The unicast transmission provides an "instant channel change" function, which enables the media device to quickly populate a media buffer and to send the media content to a display device associated with the media device. The unicast transmission enables synchronization of the media content sent via the unicast transmission with media content sent via a multicast transmission. The media distribution computing device also joins the media device to a multicast group associated with the media stream, at 210. The unicast transmission to the media device is stopped after synchronization of the unicast stream and the multicast transmission, at 212. The unicast transmission may be received by the media device at a higher rate than a play out rate of the media content from the media device. The unicast transmission may be stopped after a specified period of time (e.g., less than 16 seconds, less than 8 seconds, or less than 4 seconds) or when the media distribution computing device receives a signal from the media device to stop the unicast transmission. The method ends at 214. If the media distribution computing device receives another request for a different media stream to be sent to the media device before the unicast transmission is stopped at 212, the unicast transmission may be stopped, a multicast join to the multicast group associated with media stream may be cancelled for the media device, and the method may return to 206.

When the determination, at 206, is that the media content is for time-shifted viewing, the media device is joined to the multicast group associated with the media stream without sending the unicast transmission to the media device, at 216. At 218, the media stream is stored in a memory device. The memory device may be a memory device of the media device, a memory device of an external DVR coupled to the media device, or a memory device of a computer system coupled to the media device. The method ends at 214.

Figure 3:
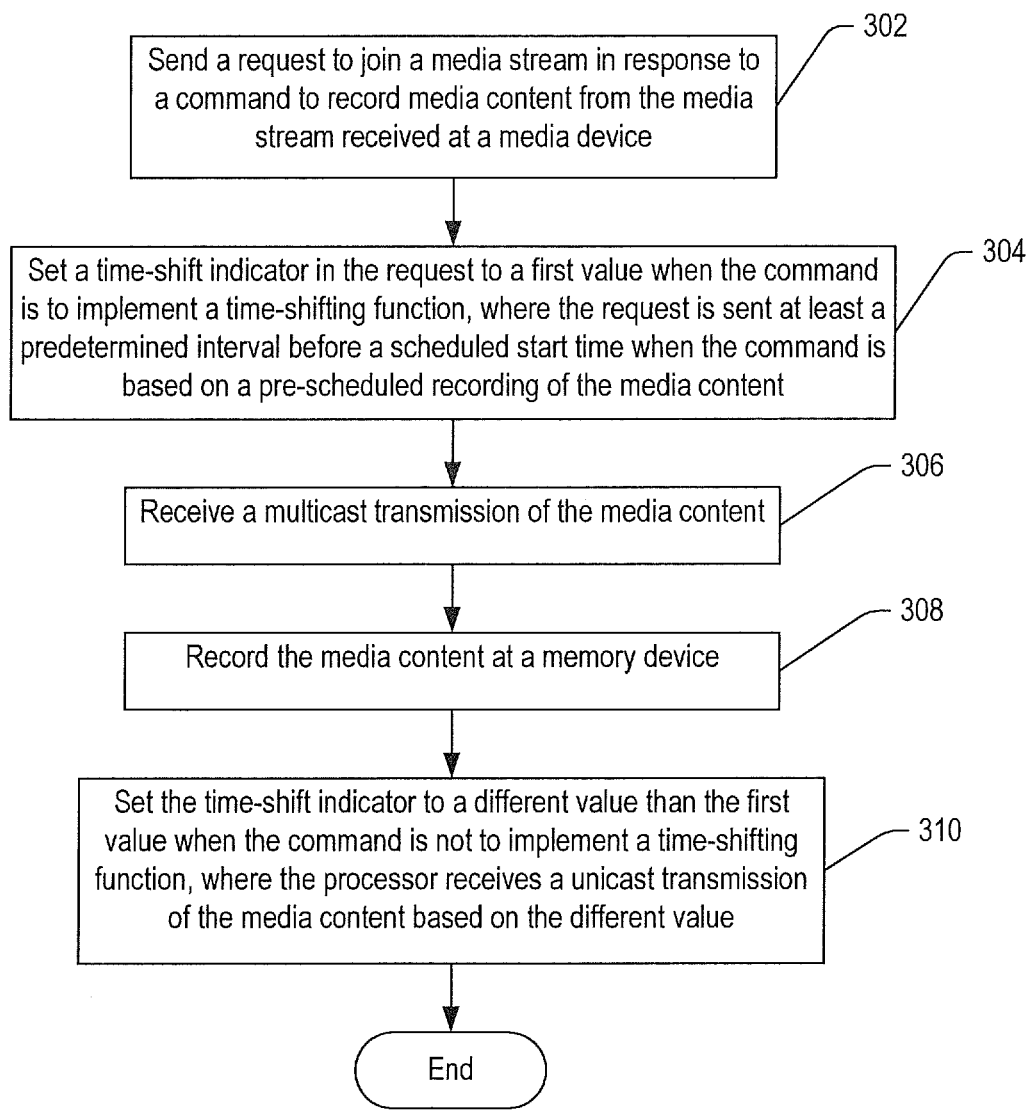
FIG. 3 is a flow diagram of a second particular embodiment of a method for processing media content requests.

FIG. 3 is a flow diagram of a second particular embodiment of a method for processing media content requests. At 302, a request to join a media stream is sent in response to a command to record media content from the media stream. The command is received at a media device. The command may be sent by a remote control device, by an external DVR, by an internal DVR of the media device, or by another device communicatively coupled to the media device. The media device may be the media device 102 depicted in FIG. 1.

The method includes setting a time-shift indicator in the request to a first value when the command is to implement a time-shifting function, at 304. The time-shifting function may be an on-demand recording of the media content or a prescheduled recording of the media content. An on-demand request occurs when the user records the media content that is being displayed. For example, the user may initiate on-demand recording by pressing a record button of the remote control device. A prescheduled recording occurs when the user enters settings to record particular media content in advance of a play time of the particular media content by the media system. For example, the user may initiate prescheduled recording by pressing a DVR button of the remote control device to display a user interface that allows the user to select a channel for recording, a time to start recording, and a time to stop recording. The request is sent at least a predetermined interval before the scheduled start time when the command is based on the pre-scheduled recording of the media content. The predetermined interval is a sufficient amount of time to allow the media device to be joined to a multicast group that provides the media content. In a particular embodiment, the predetermined interval is 100 milliseconds or less. For example, the predetermined interval may be 30 milliseconds, 20 milliseconds, 10 milliseconds, or a different interval.

In response to the request with the time-shift indicator set to the first value, a multicast transmission of the media content is received, at 306. The multicast transmission is received at the media device without the media device also receiving a unicast transmission of the media content. The media content is recorded at a memory device, at 308.

The method includes setting the time-shift indicator to a different value than the first value when the command is not to implement the time-shifting function, at 310. In response to the request with the time-shift indicator set to the different value than the first value, the media device receives a unicast transmission of the media content. When the media device does not receive a subsequent request for different media content, the media device also receives a multicast transmission of the media content. After a set period of time or when the media content received via the multicast transmission synchronizes with the media content received by the unicast transmission, the unicast transmission to the media device is stopped.

Channel change servers of a media system (e.g., of an Internet protocol television system) may receive channel change requests from subscribers. The channel change servers may facilitate multicast joins to appropriate content in response to received channel change requests. In addition to facilitating multicast joins to the appropriate content, the channel change servers may send unicast transmissions of requested content to requestors when the channel change requests indicate that requested media content is not for time-delayed viewing. When the channel change requests indicate that the requested media content is for time-delayed viewing, the channel change servers do not send the unicast transmission of the requested content to the requestor. Only sending the unicast transmission of requested content for media content that is not for time-delayed viewing decreases the work load of the channel change servers and other network devices of the media system (e.g., routers, switches, links, and so forth that facilitate transport of the unicast transmission) at times when the channel change servers receive large numbers of channel change requests by reducing the number of unicast transmissions. Reducing the work load may increase the responsiveness and reliability of the channel changing system. Only sending the unicast transmission of requested content for media content that is not for time-delayed viewing provides efficient usage of unicast bandwidth of the media system.

Figure 4:
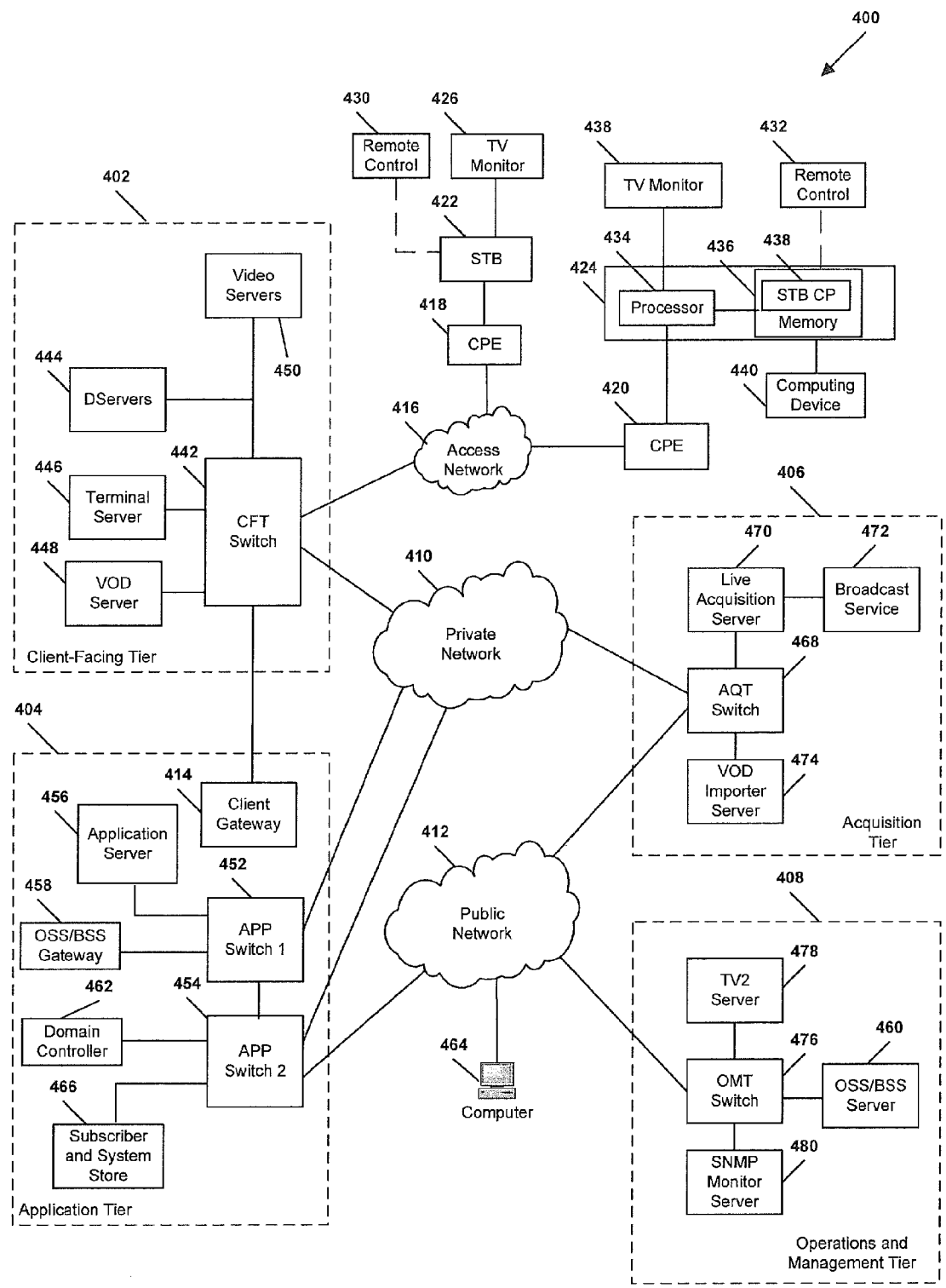
FIG. 4 is a block diagram of an illustrative embodiment of an Internet Protocol Television system.

Referring to FIG. 4, an illustrative embodiment of an Internet Protocol Television (IPTV) system is illustrated and is generally designated 400. As shown, the system 400 can include a client facing tier 402, an application tier 404, an acquisition tier 406, and an operations and management tier 408. Each tier 402, 404, 406, 408 is coupled to a private network 410, to a public network 412, such as the Internet, or to both the private network 410 and the public network 412. For example, the client-facing tier 402 can be coupled to the private network 410. Further, the application tier 404 can be coupled to the private network 410 and to the public network 412. The acquisition tier 406 can also be coupled to the private network 410 and to the public network 412. Additionally, the operations and management tier 408 can be coupled to the public network 412.

As illustrated in FIG. 4, the various tiers 402, 404, 406, 408 communicate with each other via the private network 410 and the public network 412. For instance, the client-facing tier 402 can communicate with the application tier 404 and the acquisition tier 406 via the private network 410. The application tier 404 can communicate with the acquisition tier 406 via the private network 410. Further, the application tier 404 can communicate with the acquisition tier 406 and the operations and management tier 408 via the public network 412. Moreover, the acquisition tier 406 can communicate with the operations and management tier 408 via the public network 412. In a particular embodiment, elements of the application tier 404, including, but not limited to, a client gateway 414, can communicate directly with the client-facing tier 402.

The client-facing tier 402 can communicate with user equipment via an access network 416, such as an Internet Protocol Television (IPTV) access network. In an illustrative embodiment, customer premises equipment (CPE) 418, 420 can be coupled to a local switch, router, or other device of the access network 416. The client-facing tier 402 can communicate with a first representative set-top box device 422 at a first customer premise via the first CPE 418 and with a second representative set-top box device 424 at a second customer premise via the second CPE 420. The CPE 418, 420 can include routers, local area network devices, modems, such as digital subscriber line (DSL) modems, any other suitable devices for facilitating communication between a set-top box device and the access network 416, or any combination thereof.

The client-facing tier 402 can be coupled to the CPE 418, 420 via digital subscriber lines, coaxial cables, fiber optic cables, or other connectors. In a particular embodiment, the client-facing tier 402 is coupled to the CPE 418, 420 via fiber optic cables. In another particular embodiment, the CPE 418, 420 are digital subscriber line (DSL) modems that are coupled to one or more network nodes via twisted pairs. The client-facing tier 402 can be coupled to the network nodes via fiber-optic cables or other types of connectors. Each set-top box device 422, 424 can process data received via the access network 416 and via an IPTV software platform.

The first set-top box device 422 can be coupled to a first external display device, such as a first television monitor 426, and the second set-top box device 424 can be coupled to a second external display device, such as a second television monitor 428. Moreover, the first set-top box device 422 can communicate with a first remote control 430, and the second set-top box device 424 can communicate with a second remote control 432. The set-top box devices 422, 424 can include IPTV set-top box devices, video gaming devices or consoles that are adapted to receive IPTV content, personal computers or other computing devices that are adapted to emulate set-top box device functionalities, any other device adapted to receive IPTV content and transmit data to an IPTV system via an access network, or any combination thereof.

In an exemplary, non-limiting embodiment, each set-top box device 422, 424 can receive data, video, or any combination thereof, from the client-facing tier 402 via the access network 416 and render or display the data, video, or any combination thereof, at the display device 426, 428 to which it is coupled. In an illustrative embodiment, the set-top box devices 422, 424 can include tuners that receive and decode television programming signals or packet streams for transmission to the display devices 426, 428. Further, the set-top box devices 422, 424 can include a STB processor 434 and a STB memory device 436 that is accessible to the STB processor 434. In one embodiment, a computer program, such as the STB computer program 438, can be embedded within the STB memory device 436. The STB computer program 438 can send a channel change request and can set the time-shift indicator in the channel change request based on a received command. In another illustrative embodiment, a user computing device 440, such as a personal computer, laptop or local server, can be coupled to a set-top box device, such as the first representative set-top box device 424, for example, via a universal serial bus (USB) connection or other connection.

In an illustrative embodiment, the client-facing tier 402 can include a client-facing tier (CFT) switch 442 that manages communication between the client-facing tier 402 and the access network 416 and between the client-facing tier 402 and the private network 410. The channel change server 106 depicted in FIG. 1 may include a component of the client-facing tier 402, such as a component of the CFT switch 442. As illustrated in FIG. 4, the CFT switch 442 is coupled to one or more data servers, such as D-servers 444, that store, format, encode, replicate, or otherwise manipulate or prepare video content for communication from the client-facing tier 402 to the set-top box devices 422, 424. The CFT switch 442 can also be coupled to a terminal server 446 that provides terminal devices with a connection point to the private network 410. In a particular embodiment, the CFT switch 442 can be coupled to a video-on-demand (VOD) server 448 that stores or provides VOD content imported by the IPTV system 400. Further, the CFT switch 442 is coupled to one or more video servers 450 that receive video content and transmit the content to the set-top boxes 422, 424 via the access network 416.

In an illustrative embodiment, the client-facing tier 402 can communicate with a large number of set-top boxes, such as the representative set-top boxes 422, 424, over a wide geographic area, such as a regional area, a metropolitan area, a viewing area, a designated market area or any other suitable geographic area, market area, or subscriber or customer group that can be supported by networking the client-facing tier 402 to numerous set-top box devices. In a particular embodiment, the CFT switch 442, or any portion thereof, can include a multicast router or switch that feeds one or more video streams from a video server to multiple set-top box devices.

As illustrated in FIG. 4, the application tier 404 can communicate with both the private network 410 and the public network 412. The application tier 404 can include a first application tier (APP) switch 452 and a second APP switch 454. In a particular embodiment, the first APP switch 452 can be coupled to the second APP switch 454. The first APP switch 452 can be coupled to an application server 456 and to an OSS/BSS gateway 458. In a particular embodiment, the application server 456 can provide applications to the set-top box devices 422, 424 via the access network 416, which enable the set-top box devices 422, 424 to provide functions, such as display, messaging, processing of IPTV data and VOD material, etc. In a particular embodiment, the OSS/BSS gateway 458 includes operation systems and support (OSS) data, as well as billing systems and support (BSS) data. In one embodiment, the OSS/BSS gateway 458 can provide or restrict access to an OSS/BSS server 460 that stores operations and billing systems data.

The second APP switch 454 can be coupled to a domain controller 462 that provides Internet access, for example, to users at their computers 464 via the public network 412. For example, the domain controller 462 can provide remote Internet access to IPTV account information, e-mail, personalized Internet services, or other online services via the public network 412. In addition, the second APP switch 454 can be coupled to a subscriber and system store 466 that includes account information, such as account information that is associated with users who access the IPTV system 400 via the private network 410 or the public network 412. In an illustrative embodiment, the subscriber and system store 466 can store subscriber or customer data and create subscriber or customer profiles that are associated with IP addresses of corresponding set-top box devices 422, 424.

In a particular embodiment, the application tier 404 can include a client gateway 414 that communicates data directly to the client-facing tier 402. In this embodiment, the client gateway 414 can be coupled directly to the CFT switch 442. The client gateway 414 can provide user access to the private network 410 and the tiers coupled thereto. In an illustrative embodiment, the set-top box devices 422, 424 can access the IPTV system 400 via the access network 416, using information received from the client gateway 414. User devices can access the client gateway 414 via the access network 416, and the client gateway 414 can allow such devices to access the private network 410 once the devices are authenticated or verified. Similarly, the client gateway 414 can prevent unauthorized devices, such as hacker computers or stolen set-top box devices, from accessing the private network 410, by denying access to these devices beyond the access network 416.

For example, when the first representative set-top box device 422 accesses the client-facing tier 402 via the access network 416, the client gateway 414 can verify subscriber information by communicating with the subscriber and system store 466 via the private network 410. Further, the client gateway 414 can verify billing information and status by communicating with the OSS/BSS gateway 458 via the private network 410. In one embodiment, the OSS/BSS gateway 458 can transmit a query via the public network 412 to the OSS/BSS server 460. After the client gateway 414 confirms subscriber and/or billing information, the client gateway 414 can allow the set-top box device 422 to access IPTV content and VOD content at the client-facing tier 402. If the client gateway 414 cannot verify subscriber information for the set-top box device 422, e.g., because it is connected to an unauthorized twisted pair, the client gateway 414 can block transmissions to and from the set-top box device 422 beyond the access network 416.

As indicated in FIG. 4, the acquisition tier 406 includes an acquisition tier (AQT) switch 468 that communicates with the private network 410. The AQT switch 468 can also communicate with the operations and management tier 408 via the public network 412. In a particular embodiment, the AQT switch 468 can be coupled to a live acquisition server 470 that receives or acquires television content, movie content, advertisement content, other video content, or any combination thereof, from a broadcast service 472, such as a satellite acquisition system or satellite head-end office. In a particular embodiment, the live acquisition server 470 can transmit content to the AQT switch 468, and the AQT switch 468 can transmit the content to the CFT switch 442 via the private network 410.

In an illustrative embodiment, content can be transmitted to the D-servers 444, where it can be encoded, formatted, stored, replicated, or otherwise manipulated and prepared for communication from the video server(s) 450 to the set-top box devices 422, 424. The CFT switch 442 can receive content from the video server(s) 450 and communicate the content to the CPE 418, 420 via the access network 416. The set-top box devices 422, 424 can receive the content via the CPE 418, 420, and can transmit the content to the television monitors 426, 428. In an illustrative embodiment, video or audio portions of the content can be streamed to the set-top box devices 422, 424.

Further, the AQT switch 468 can be coupled to a video-on-demand importer server 474 that receives and stores television or movie content received at the acquisition tier 406 and communicates the stored content to the VOD server 448 at the client-facing tier 402 via the private network 410. Additionally, at the acquisition tier 406, the video-on-demand (VOD) importer server 474 can receive content from one or more VOD sources outside the IPTV system 400, such as movie studios and programmers of non-live content. The VOD importer server 474 can transmit the VOD content to the AQT switch 468, and the AQT switch 468, in turn, can communicate the material to the CFT switch 442 via the private network 410. The VOD content can be stored at one or more servers, such as the VOD server 448.

When users issue requests for VOD content via the set-top box devices 422, 424, the requests can be transmitted over the access network 416 to the VOD server 448, via the CFT switch 442. Upon receiving such requests, the VOD server 448 can retrieve the requested VOD content and transmit the content to the set-top box devices 422, 424 across the access network 416, via the CFT switch 442. The set-top box devices 422, 424 can transmit the VOD content to the television monitors 426, 428. In an illustrative embodiment, video or audio portions of VOD content can be streamed to the set-top box devices 422, 424.

FIG. 4 further illustrates that the operations and management tier 408 can include an operations and management tier (OMT) switch 476 that conducts communication between the operations and management tier 408 and the public network 412. In the embodiment illustrated by FIG. 4, the OMT switch 476 is coupled to a TV2 server 478. Additionally, the OMT switch 476 can be coupled to an OSS/BSS server 460 and to a simple network management protocol (SNMP) monitor 480 that monitors network devices within or coupled to the IPTV system 400. In a particular embodiment, the OMT switch 476 can communicate with the AQT switch 468 via the public network 412.

In an illustrative embodiment, the live acquisition server 470 can transmit content to the AQT switch 468, and the AQT switch 468, in turn, can transmit the content to the OMT switch 476 via the public network 412. In this embodiment, the OMT switch 476 can transmit the content to the TV2 server 478 for display to users accessing the user interface at the TV2 server 478. For example, a user can access the TV2 server 478 using a personal computer (PC) 464 coupled to the public network 412.

Figure 5:
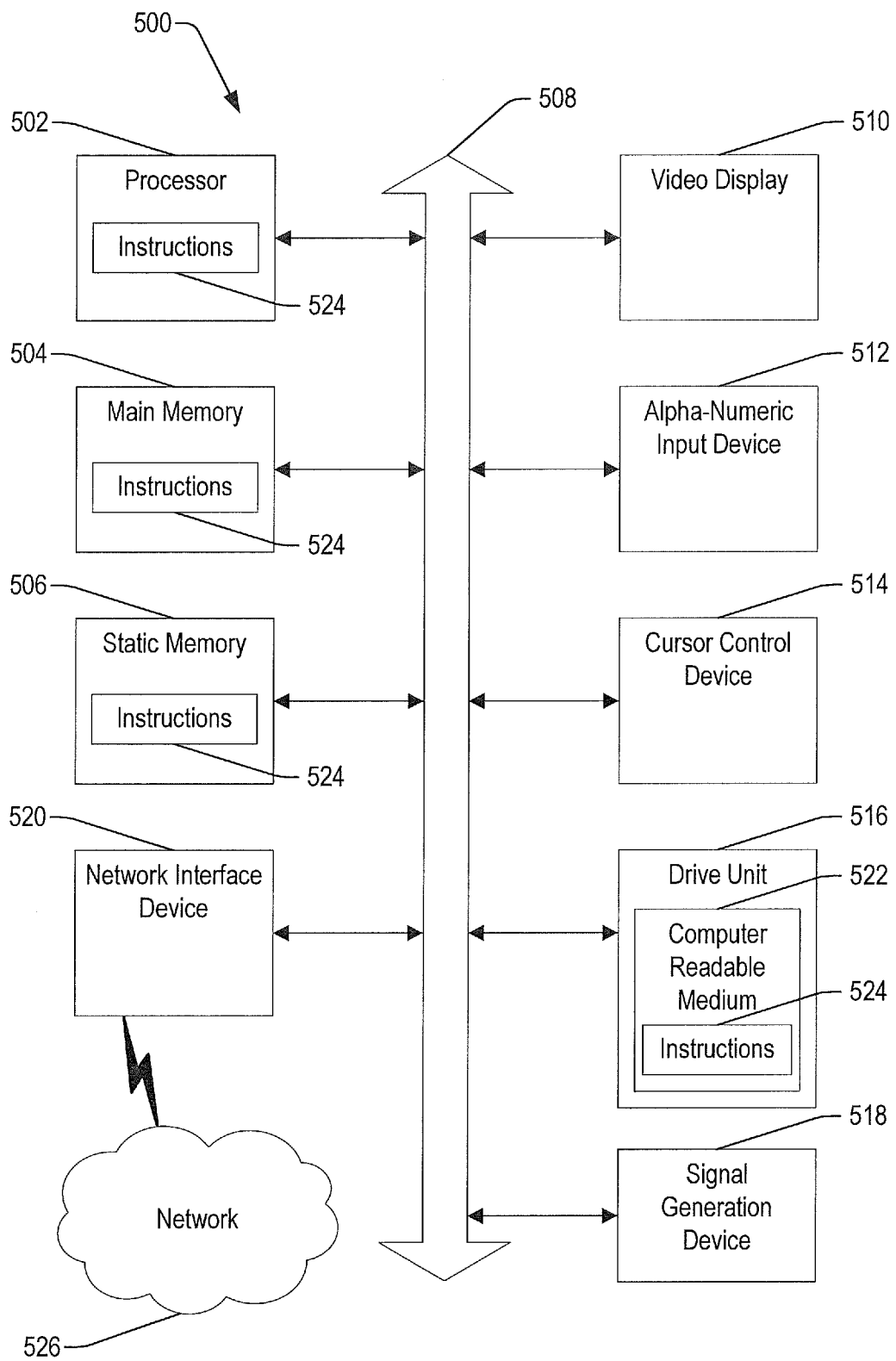
FIG. 5 is a block diagram of an illustrative embodiment of a general computer system.

Referring to FIG. 5, an illustrative embodiment of a general computer system is shown and is designated 500. The computer system 500 may include a set of instructions that can be executed to cause the computer system 500 to perform any one or more of the methods or computer based functions disclosed herein. The computer system 500 may operate as a standalone device or may be connected, e.g., using a network, to other computer systems or peripheral devices. For example, the computer system 500 may include or be included within any one or more of the media device 102, the channel change server 106, the display device 112, the remote control device 116, the external DVR 122, the computer system 124, and the mobile communication device 126 described with reference to FIG. 1.

In a networked deployment, the computer system 500 may operate in the capacity of a server or as a client user computer in a server-client user network environment, or as a peer computer system in a peer-to-peer (or distributed) network environment. The computer system 500 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a web appliance, or any other machine capable of executing a set of instructions (sequential or otherwise) that specify actions to be taken by that machine. In a particular embodiment, the computer system 500 may be implemented using electronic devices that provide video, audio, or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. Moreover, the computer system 500 may include a main memory 504 and a static memory 506, which can communicate with each other via a bus 508. As shown, the computer system 500 may further include a video display unit 510, such as a liquid crystal display (LCD), a projection television system, a flat panel display, or a solid state display. Additionally, the computer system 500 may include an input device 512, such as a keyboard, and a cursor control device 514, such as a mouse. The computer system 500 may also include a disk drive unit 516, a signal generation device 518, such as a speaker or remote control, and a network interface device 520. Some computer systems 500 may not include an input device (e.g., a server may not include an input device).

In a particular embodiment, as depicted in FIG. 5, the disk drive unit 516 may include a computer-readable non-transitory storage medium 522 in which one or more sets of instructions 524, e.g. software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable non-transitory storage media.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by the computer system 500. Further, in an exemplary, non-limited embodiment, implementations may include distributed processing, component/object distributed processing, and parallel processing. Alternatively, virtual computer system processing may be constructed to implement one or more of the methods or functionality as described herein.

The present disclosure contemplates a computer-readable non-transitory storage medium that stores instructions 524 or receives, stores and executes instructions 524 responsive to a propagated signal, so that a device connected to a network 526 may communicate voice, video or data over the network 526. Further, the instructions 524 may be transmitted or received over the network 526 via the network interface device 520.

While the computer-readable non-transitory storage medium is shown to be a single medium, the term "computer-readable non-transitory medium" includes a single medium or multiple media, such as a centralized or distributed database, and/or associated caches and servers that store one or more sets of instructions. The term "computer-readable non-transitory medium" shall also include any medium that is capable of storing instructions for execution by a processor or that cause a computer system to perform any one or more of the methods or operations disclosed herein.

In a particular non-limiting, exemplary embodiment, the computer-readable non-transitory storage medium may include a solid-state memory such as a memory card or other package that houses one or more non-volatile read-only memories. Further, the computer-readable non-transitory storage medium may be a random access memory or other volatile re-writable memory. Additionally, the computer-readable non-transitory storage medium may include a magneto-optical or optical medium, such as a disk or tapes or other storage device. Accordingly, the disclosure is considered to include any one or more of a computer-readable non-transitory storage medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP, IEEE 802.x) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method, comprising:
    in response to determining, at a media distribution computing device, that a request for a media stream to be provided to a media device does not indicate a scheduled recording of media content associated with the media stream, sending a unicast transmission including at least a portion of the media content to the media device; and
    in response to determining, at the media distribution computing device, that the request indicates the scheduled recording of the media content, joining the media device to a multicast group associated with the media stream without sending the unicast transmission to the media device.

2. The method of claim 1, wherein the scheduled recording is to begin at a user-specified start time for time-shifted viewing of the media content.

3. The method of claim 1, further comprising joining the media device to the multicast group associated with the media stream when the media content is not determined to be for time-shifted viewing.

4. The method of claim 3, wherein the portion of the media content sent to the media device in the unicast transmission enables synchronization of the media content sent via the unicast transmission with media content sent via multicast transmission when the multicast group is joined, and further comprising stopping the unicast transmission after synchronization.

5. The method of claim 1, further comprising determining whether the request includes a time-shift indicator.

6. The method of claim 5, wherein the time-shift indicator indicates that the media stream is to be stored by the media device instead of displayed.

7. The method of claim 6, wherein the media device sends the media stream to a digital video recorder coupled to the media device for storage.

8. The method of claim 6, wherein the media device stores the media stream in a memory of the media device.

9. The method of claim 1, wherein the media distribution computing device comprises a computing device of an internet protocol television system and the media stream includes a particular channel provided by the internet protocol television system.

10. The method of claim 1, wherein the request comprises at least one of:
    an on-demand request initiated from the media device,
    a first request sent at a particular time scheduled at the media device,
    a second request sent at the particular time scheduled at a digital video recorder coupled to the media device, or
    a third request received from a communication device other than the media device.

11. A system comprising:
    a processor; and a memory device accessible to the processor, the memory device comprising instructions executable by the processor to perform operations comprising:

sending a first request from a media device to a media system to receive a first media stream associated with media content, wherein the media content airs at a particular time, wherein the first request includes a time-shift indicator indicating that no unicast transmission of the first media stream should be sent to the media device, and wherein the first request is sent at least a particular time period before the particular time to enable the media system to join the media device to a multicast group that provides the first media stream before the particular time; and receiving the media content via the first media stream as a multicast transmission.

12. The system of claim 11, wherein the operations further comprise receiving a user command to record, to the media device, the media content of the first media stream, wherein the user command is received prior to sending the first request.

13. The system of claim 11, wherein the media stream is received from an internet protocol television system.

14. The system of claim 11, wherein the operations further comprise storing the received media content at the media device.

15. The system of claim 14, wherein the media content is stored at the memory device.

16. The system of claim 11, further comprising an interface that couples a display device to the processor, wherein the operations further comprise:

receiving a user command to change a second media stream sent to the display device coupled to the interface to a third media stream, sending a second request to join the third media stream, wherein the second request does not include the time-shift indicator, receiving a unicast transmission of the third media stream, and using the unicast transmission to initially provide the third media stream to the display device.

17. The system of claim 16, wherein the operations further comprise:

receiving a multicast transmission of the third media stream; and using the multicast transmission to provide the third media stream to the display device after synchronization of the multicast transmission with the unicast transmission when a second user command to change the third media stream is not received before synchronization occurs.

18. The system of claim 11, wherein the particular time period is less than about 100 milliseconds.

19. A computer readable storage device including instructions that, when executed by a computer, cause the computer to perform operations comprising:

sending a request, at a first time, from a media device to a media system to receive a media stream that includes media content, the media content having a scheduled start time that is subsequent to the first time, wherein the request is sent to the media system at a particular time before the scheduled start time, wherein the request includes a time-shift indicator indicating that no unicast transmission of the media stream should be sent to the media device, and wherein sending the request at the particular time before the scheduled start time enables the media system to join the media device to a multicast group that provides the media stream prior to the scheduled start time; and receiving the media content via the media stream as a multicast transmission.

20. The computer readable storage device of claim 19, wherein the particular time is less than about 100 milliseconds before the scheduled start time.

* * * * *